US010860656B2

(12) United States Patent
Sobhy Deraz et al.

(10) Patent No.: US 10,860,656 B2
(45) Date of Patent: Dec. 8, 2020

(54) MODULAR DATA INSIGHT HANDLING FOR USER APPLICATION DATA

(71) Applicant: Microsoft Technology Licensing, LLC, Redmond, WA (US)

(72) Inventors: Ehab Sobhy Deraz, Bellevue, WA (US); Charles David Ellis, Seattle, WA (US); Michael Joe Woolf, Seattle, WA (US); Matthew Willem Asplund, Kirkland, WA (US); Mathew B. Olinger, Redmond, WA (US); Sameer Surendra Jagdale, Bellevue, WA (US); Charles Strempler, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 15/962,374

(22) Filed: Apr. 25, 2018

(65) Prior Publication Data

US 2019/0171777 A1 Jun. 6, 2019

Related U.S. Application Data

(60) Provisional application No. 62/594,938, filed on Dec. 5, 2017.

(51) Int. Cl.
*G06F 16/9038* (2019.01)
*G06F 9/54* (2006.01)
*G06N 20/00* (2019.01)
*G06F 16/907* (2019.01)
*G06F 16/26* (2019.01)

(52) U.S. Cl.
CPC ............ *G06F 16/9038* (2019.01); *G06F 9/54* (2013.01); *G06F 16/26* (2019.01); *G06F 16/907* (2019.01); *G06N 20/00* (2019.01)

(58) Field of Classification Search
CPC ........ G06F 9/54; G06F 16/26; G06F 16/9038; G06F 16/907; G06N 20/00
See application file for complete search history.

(56) References Cited

U.S. PATENT DOCUMENTS 9,024,952 B2 * 5/2015 Mital .................... G06T 11/206
345/440
2004/0111410 A1 6/2004 Burgoon et al.
(Continued)

OTHER PUBLICATIONS

Dolley, Ryan, "Elementary My Dear: Watson Analytics First Look", Blog posted Mar. 30, 2015, 7 pages. (Year: 2015).*

(Continued)

*Primary Examiner* — Scott A. Waldron

(57) ABSTRACT

In non-limiting examples of the present disclosure, systems, methods and devices for assisting with providing dataset insights associated with datasets are presented. A dataset and a query relating to the dataset may be received. The dataset may be processed to determine metadata that describes one or more properties of the dataset. The dataset, the determined metadata, and the user query may be provided to one or more modular recommendation elements for processing into an insight result that indicates a result from data analysis directed to the query. The insight result may be transferred in a portable format for use by the productivity application in displaying one or more insight objects based on the insight result.

15 Claims, 6 Drawing Sheets

(56) References Cited

U.S. PATENT DOCUMENTS

| | | | |
|---|---|---|---|
| 2011/0137636 A1 | 6/2011 | Srihari et al. | |
| 2013/0145244 A1 | 6/2013 | Rothschiller et al. | |
| 2015/0025925 A1* | 1/2015 | Moore | G06Q 10/063 705/7.11 |
| 2015/0370872 A1 | 12/2015 | Raghavan et al. | |
| 2017/0061286 A1 | 3/2017 | Kumar et al. | |
| 2018/0052884 A1 | 2/2018 | Kale et al. | |
| 2018/0129372 A1* | 5/2018 | Ellis | G06F 3/0482 |
| 2019/0095508 A1* | 3/2019 | Porath | G06F 16/34 |
| 2019/0102430 A1* | 4/2019 | Wang | G06F 16/24549 |
| 2020/0034481 A1 | 1/2020 | Asplund et al. | |

OTHER PUBLICATIONS

Dolley, Ryan, "Review: Watson Analytics Explore", Blog posted Jul. 6, 2015, 7 pages. (Year: 2015).*

Dolley, Ryan, "Watson Analytics Professional Unveiled", Blog posted Apr. 29, 2015, 5 pages. (Year: 2015).*

Dolley, Ryan, "Watson Analytics Review: Natural Language Query", Blog posted Apr. 26, 2015, 12 pages. (Year: 2015).*

Miller, James D., "Learning IBM Watson Analytics", Mar. 2016, Packt Publishing, 243 pages. (Year: 2016).*

Chang, et al., "SUTime: A Library for Recognizing and Normalizing Time Expressions", In Proceedings of the Eighth International Conference on Language Resources and Evaluation, May 23, 2012, pp. 3735-3740.

"International Search Report and Written Opinion Issued in PCT Application No. PCT/US2019/038088", dated Aug. 21, 2019, 12 Pages.

Dasoriya, Rayan, "A Review of Big Data Analytics Over Cloud", In the Proceedings of International Conference on Consumer Electronics—Asia, Oct. 5, 2017, 6 Pages.

Dolley, Ryan, et al., "Watson Analytics Review: Natural Language Query", Retrieved From: http://ibmblueview.com/watson-analytics-review-natural-language-query/, Apr. 26, 2015, 15 Pages.

"International Search Report and Written Opinion Issued in PCT Application No. PCT/US18/062154", dated Feb. 14, 2019, 12 Pages.

"Non-Final Office Action Issued in U.S. Appl. No. 16/179,806", dated Jul. 24, 2020, 21 pages.

* cited by examiner

MODULAR DATA INSIGHT HANDLING FOR USER APPLICATION DATA

CROSS-REFERENCE TO RELATED APPLICATIONS

This application claims priority to U.S. Provisional Patent Application No. 62/594,938, entitled "Modular Data Insight Handling for User Application Data", filed on Dec. 5, 2017, which is incorporated by reference herein in its entirety.

BACKGROUND

Various user productivity applications allow for data entry and analysis. These applications can provide for data creation, editing, and analysis using spreadsheets, presentations, documents, messaging, or other user activities. Users can store data files associated with usage of these productivity applications on various distributed or cloud storage systems so that the data files can be accessible wherever a suitable network connection is available. In this way, a flexible and portable user productivity application suite can be provided.

However, the information technology industry has continually increased the amount of information as well as the quantity of sources of information. Users can be quickly overwhelmed with data analysis due to the sheer quantity of data or number of options available for managing and presenting the data and associated analysis conclusions. Moreover, users within an organization have a difficult time leveraging the data and analysis of co-workers, and leveraging data analysis while switching between small form-factor devices (such as smartphones and tablet computers) and large form-factor devices (such as desktop computers).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing dataset insights for a productivity application. A query and/or command related to a dataset may be received. The dataset may comprise a plurality of values included in the productivity application and/or a plurality of values from one or more secondary data sources. The query and/or command may comprise a user-provided input to have an insight related to the dataset surfaced on a display of a user interface of the productivity application or an automated query and/or command generated by the productivity application (e.g., queries and/or commands may be automatically generated when new datasets are created).

In examples, the query and/or command, the dataset and metadata associated with the dataset may be sent to an insight platform for processing. The insight platform may identify, based on the received query and/or command, dataset, and metadata, one more insight types for surfacing via the productivity application. In some examples, the insight platform may identify insight types for surfacing based on additional information, including user preferences, the dataset type, a type of information included in the dataset, past user interactions with the insight platform, past user interactions with insights, past user interactions with the productivity application, and/or past user interactions with one or more datasets related to the received dataset.

In some examples, the insight platform may send one or more insight types to the productivity application in a portable format for surfacing on the display of the productivity application. The surfaced one or more insights may comprise graphs, charts, tables, pivot tables, textual content, audio content, and/or pictures. The information included in the one or more surfaced insights may comprise visual and/or audio representations of: information from the dataset, summaries of information from the dataset, comparison of information from the dataset with information from one or more other datasets, projections associated with information from the dataset, and selectable elements for providing information about the surfaced insights based on receiving a modification to the one or more insights, receiving a modification to one or more values included in a dataset related to the one or more insights, and/or receiving a query and/or command directed to the generation of the one or more insights.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

User productivity applications provide for user data creation, editing, and analysis using spreadsheets, slides, documents, messaging, or other application activities. However, due in part to continually increasing amounts of user data as well as the quantity of different sources of information, users can be quickly overwhelmed with tasks related to analyzing this data. In workplace environments, such as a company or other organization, users might have a difficult time leveraging the data and analysis performed by other co-workers. This level of growth in data analysis increases a need to augment a user ability to make sense and use increasing sources and volumes of data.

In the examples herein, user data can be leveraged in various data visualization environments to create "insight" results or recommendations for users during data analysis stages. In some examples, insight results, as described herein, may comprise extensions of analytic objects that include charts, pivot tables, tables, graphs, and the like. In additional examples, insight results may comprise further content that represents an insight, such as summary verbiage, paragraphs, graphs, charts, pivot tables, data tables, or pictures that are generated for users which indicate key takeaways from the data.

Figure 1:
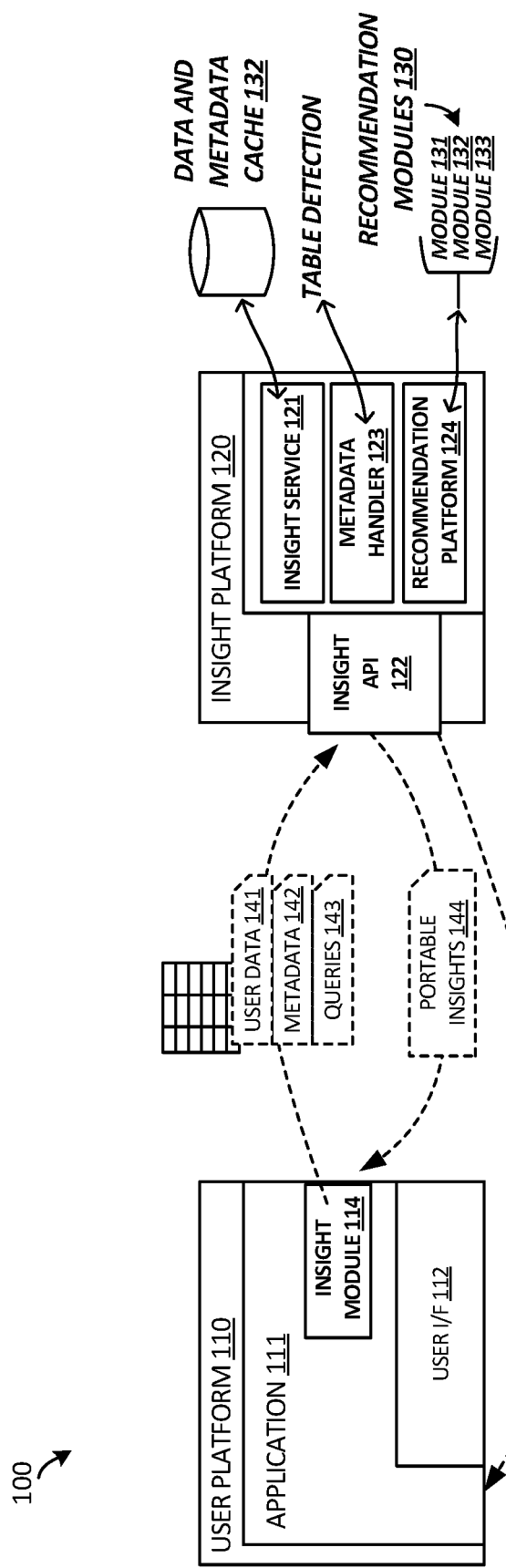
FIG. 1 illustrates a data insight environment in an example.

Turning now to a first example system for data visualization and insight generation, FIG. 1 is presented. FIG. 1 illustrates data visualization environment 100. Environment 100 includes user platforms 110 and insight platform 120. Each of the elements of environment 100 can communicate over one or more communication links, which can comprise physical and logical network links, among others.

User platform 110 provides user interface 112 to application 111. Application 111 can comprise a user productivity application for use by an end user in data creation, analysis, and presentation. For example, application 111 might comprise a spreadsheet, word processor, database, or presentation application. User platform 110 also includes insight module 114. Insight module 114 can interface with insight platform 120 as well as provide insight services within application 111. User interface 112 can include graphical user interfaces, console interfaces, web interfaces, text interfaces, among others.

Insight platform 120 provides insight services, such as insight service 121, insight application programming interface (API) 122, metadata handler 123, and recommendation platform 124. Insight service 121 can invoke various other elements of insight platform 120, such as API 122 for interfacing with clients. Insight service 121 can also invoke one or more recommendation modules, such as provided by recommendation platform 124.

In operation, insight service 121 in coordination with API 122, metadata handler 123, and recommendation platform 124 can process one or more datasets to establish data insight results, referred to in FIG. 1 as portable insights 144, that can be provided to clients/user platforms which present graphical visualization portions, data descriptions or conclusions/summaries, object metadata, as well as the underlying datasets. Portable insights 144 can produce extensions of typical analytic objects, such as charts, graphs, tables, pivot tables, data descriptions, and other data or document presentation elements. Portable insights 144 can include other content that represents insight objects, such as verbiage or summary statements that provide additional information to a user, such key takeaways of data insight analysis, and other data descriptions.

In operation, a user of user platform 110 or application 111 might indicate a set of data or target dataset for which data insight analysis is desired. This analysis can include traditional data analysis such as math functions, static graphing of data, pivoting within pivot tables, or other analysis. However, in the examples herein, an enhanced form of data analysis is performed, namely insight analysis. At the user application level, one or more insight modules are included to not only present insight analysis options to the user but also interface with insight platform 120 which performs the insight analysis, among other functions. Upon designation of one or more target datasets, a user can employ insight service 121 via insight API 122 to process the target datasets and generate one or more candidate insights, portable insight results, and associated insight metadata. In FIG. 1, this process is shown using user data 141 and optional metadata 142 supplied by the user and/or application 111. However, it should be understood that target datasets can be supplied from other data sources, including in-application data sources, data documents, data storage elements, distributed data storage systems, or other data sources, such as data repositories.

As mentioned above, metadata 142 can also be provided with the user data 141. This metadata might be omitted in some examples, and determined by metadata handler 123 of insight platform 120. Metadata 142 can include properties or descriptions about user data 141, such as column/row headers, data contexts, application properties, and other information. Moreover, identifiers can be associated with the user data or with already-transferred user data and metadata. These identifiers can be used by insight module 114 to reference the data/metadata within insight platform 120. A further discussion of these identifiers is discussed below. Metadata processing of metadata handler is discussed in FIGS. 2-3 below.

Metadata handler 123 processes user data sets, such as user data 141, along with any user-provided or application-provided metadata associated with user data 141. Metadata handler 123 determines various metadata associated with user data 141, such as extracting properties, data descriptions, headers, footers, column/row descriptors, or other information. For example, if data 141 is provided as a table with column and/or row headers, metadata handler 123 can extract the column or row headers as metadata. Moreover, metadata handler 123 can intelligently determine what the column/row information metadata might comprise in examples where metadata accompanies the data or when metadata does not accompany the data. For example, properties of the data itself might be determined by metadata handler 123 to establish metadata for the data, such as data features, numerical formats, symbols embedded with the data, patterns among the data, column or row organizations determined for the data, or other data properties. Metadata 142 that might accompany user data 141 can also inform further metadata analysis by metadata handler 123, such as when only a subset of the data is labeled or has headers.

Once metadata is determined for the data sets, Metadata handler 123 can cache or otherwise store the metadata, along with any associated user data, in cache 132. Cache 132 can comprise one or more data structures for holding metadata and user data for use by insight service 121 and recommendation platform 124. Cache 132 can advantageously hold this data/metadata for use over one or more insight analysis processes and user application requests for analysis. Various identifiers can be associated with the data or metadata for reference by insight module 114 when performing further/later data insight analysis. Insight results determined for various user data sets can also be stored in association with the identifiers for later retrieval, referencing, or handling by any module, service, or platform in FIG. 1. Moreover, metadata and data cached in cache 132 can be employed in parallel by any of recommendation modules 130. In some examples one or more components of insight platform 120 (e.g., insight service 121, metadata handler 123, recommendation platform 124, insight API 122) may send metadata 142 back to user platform 110 upon metadata handler 123 determining properties associated with metadata 142. Metadata 142, and properties associated with metadata 142, may be stored in association with application 111 and/or a document containing a data set from which metadata 142 was determined. Thus, in examples where metadata 142 is sent back to user platform 110, insight module 114 may not have to communicate with cache 132 for further/later data insight analysis of a previously analyzed data set because metadata 142 is stored with application 111 in user platform 110.

Insight service 121 establishes content of the data insight results according to processing a target user dataset using data analysis recommenders provided by recommendation platform 124. Portable insights 144 can indicate insight results and insight candidates for presentation to a user by application 111. For example, portable insights 144 can describe insight results in a manner that can be interpreted by application 111 to produce application-specific insight objects for presentation to a user. These insight objects can be presented in user interface 112, such as for inclusion into a spreadsheet canvas of a spreadsheet application. Object metadata, such as metadata determined by metadata handler 123, can accompany portable insights 144.

To determine the data insight results, recommendation modules 130 are employed. These recommendation modules can be used to establish data analysis preferences derived from past user activity, application usage modalities, organizational traditions with regard to data analysis, individualized data processing techniques, or other activity signals. Knowledge graphing or graph analysis can be employed to identify key processes or data analysis techniques that can be employed in the associated insight analysis. Knowledge repositories can be established to store these data analysis preferences and organizational knowledge for later use by users employing the insight services discussed herein. Machine learning, heuristic analysis, or other intelligent data analysis services can comprise the recommendation modules. Each module can be 'plugged' into recommendation platform 124 for use in data analysis to produce insight recommendations for the user data. Recommendation modules 131-133, among others, might be dynamically added or removed, instantiated or de-instantiated, among other actions, responsive to the user data, metadata, desired analysis types, user instructions, application types, past analyses on user data, or other factors.

Turning now to a further discussion of recommendation platform 124, insight service 121 can grow to support one or more recommenders and recommendation types. It can be advantageous to call out the explicit integration steps for recommenders to hook into insight service 121. Below are example processes by which a new recommender may register itself, as well as a processing pipeline for creating machine-learned intelligent recommendation providers.

Several terms are included in the discussion herein, which have example descriptions as follows. Featurization [Feature Extraction] is a machine learning term used to describe the process of converting the raw input into a collection of features used as inputs into a Machine Learning Model. A 'feature' comprises an individual measurement used as input into a Machine Learning Model. Metadata can include information describing general properties about a given dataset, such as column types, data orientation, and the like. Lazy Evaluation comprises a process by which a value is only calculated when explicitly requested. A recommender may comprise a single algorithm, either heuristic or machine-learning based, that takes in the provided metadata from a dataset, and generates a set of recommendations, such as charts, tables, design, and the like. Through the application of featurization and machine learning, recommenders can be intelligently trained to identify data structures and/or metadata associated with datasets that the recommenders can generate insights for in association with insight platform 120. Featurization and machine learning may be applied on an entity-specific basis, such that insight types (e.g., charts, tables, design) that entities (e.g., individual users, user demographics, corporate entities, entity groups) have indicated a preference for over time may be generated by appropriate recommenders. Thus, through the training of recommenders, and the application of lazy evaluation, only values that are associated with recommenders that generate insight types that are relevant/preferred to specific entities need be calculated, thereby significantly reducing the processing costs associated with calculation of values related to non-preferred recommenders, and storage costs associated with caching or otherwise storing values for recommenders that are not relevant to the entities.

During usage of recommendation platform 124, sharing allows for easy sharing of as much code and resources as possible between training, testing and production. This can be achieved using shared binaries and shared processing pipelines. Versioning allows for easily changing the versions of all parts of the pipeline and ensuring they can be kept in sync. Quality controls maintain a minimum quality bar for all recommendation modules for both accuracy and performance.

The development of a recommendation module can be broken down into three main stages: generation, validation and production. The generation stage consists of either training a machine learning model or designing/implementing a heuristic-based algorithm. Once a recommendation module is created it can be run through multiple rings of validation. This may consist of both a performance portion and a quality assurance. Each recommendation module can be assigned a budget for processor time as well as minimum required accuracy. The final stage of the pipeline can include running each individual recommendation module in production. Recommendation platform 124 can be responsible for federating out individual requests to all registered recommendation modules and aggregating the results.

This design advantageously supports the ability for machine learning models to be trained on a feature set that is as identical as reasonable to what may be seen in real user data. This means that as updates are made to the supported recommendation module feature set and associated generation logic, each recommendation module can train a new model that can be utilized to match the new version and the production service can ensure that the hosted models are in sync with their feature set version. A part of recommendation platform 124 is the continued improvement and expansion of the features. To ensure that the machine learning/training models are working as expected, the same logic may be used to generate the features that are used to train the models as well as validate and run them.

Turning now to the operation of API 122, various inputs and outputs are provided. As input, API 122 can receive user data 141, such as datasets in a two-dimensional tabular format. In some examples, this user data may have accompanying metadata 142. In other examples this user data may have embedded metadata. In still other examples, this user data may have no accompanying metadata. One or more applications and/or users associated with the infrastructure described herein may initiate one or more queries or questions posed towards user data 141. These queries are indicated in queries 143 in FIG. 1, and can comprise natural language questions posed by users and/or applications related to the user data and submitted through API 122 in a standardized format. A user might ask one or more questions for analysis by insight platform 120, and provide a portion of data to insight platform 120. The queries indicated by the user and/or application, and included in queries 143, can include questions such as, "I need charts for this data . . . " or "Provide the metadata for this data . . . " or "Summarize this data . . . " among other query types. API 122 provides for input mechanisms for application 111 through insight module 114 to input the data, metadata, and queries for use by insight service 121. Based on the inputs (e.g., data, metadata, queries), insight platform 120 provides, through API 122, one or more insight results indicated by portable insights 144.

As outputs, such as portable insights 144, API 122 can provide insight results in a standardized output for interpretation by any application to present the insight results to the user in that application's native format. Portable insights 144 comprises descriptions of the insight results which can be interpreted by application 111 or insight module 114 to generate visualizations of the insight results to users. In this manner, a flexible and/or portable insight result can be presented as an output by API 122 and interpreted for display as-needed and according to specifics of the application user canvas.

API 122 defines the formatting for inputs and outputs, so that applications and users can consistently present data, metadata, and queries for analysis by insight platform 120. API 122 also defines the mechanisms by which application 111 can communicate with insight platform 120, such as allowed input types, input ranges, and input formats, as well as possible outputs resultant from the inputs. API 122 also can provide identifiers responsive to provided user data, metadata, and queries so that data, metadata, and queries can be referenced later by clients, such as application 111, as stored in cache 132.

In one example, API 122 comprises an insights representational state transfer (REST) style of API. The insights REST API comprises a web service for applying heuristic and machine learning-based analysis to a set of data in order to retrieve high level interesting views, called insights herein, of the data. The insights REST API can provide recommendations for charts and/or pivots of the user data. The insights REST API can also provide metadata services used for natural language insights, and other analysis.

An example operation flow involving a client, such as application 111, communicating with API 122 may comprise the following flow.

At a first operation, a client uploads a range of client data to the service, which initiates a data session. In some examples, this may cause a URL to be returned containing a unique "range id" that is 1:1 with the data session. In examples where a user triggered refresh has occurred, a new "range id" may be generated and returned in a URL.

At a second operation, the client provides an indication of a type of analysis they want performed. Analysis options may include receiving recommendations for insights, or metadata services used for natural language insights, among other analysis choices. This returns an Operation ID, which is 1:1 with the process of performing the requested analysis.

At a third operation, the client waits for the operation to complete, periodically polling the service, and at a fourth operation the client is provided with an opportunity to cancel an operation.

At a fifth operation, the client gets the results of the completed operation. Additional requests may be made on the same data in cache 132 (e.g., correct the metadata as requested by the user, then get new recommendations), without needing to upload the data again. That is, the operation flow may return to the second operation.

At a sixth operation, the client closes the data session, and the data session ends.

Figure 2:
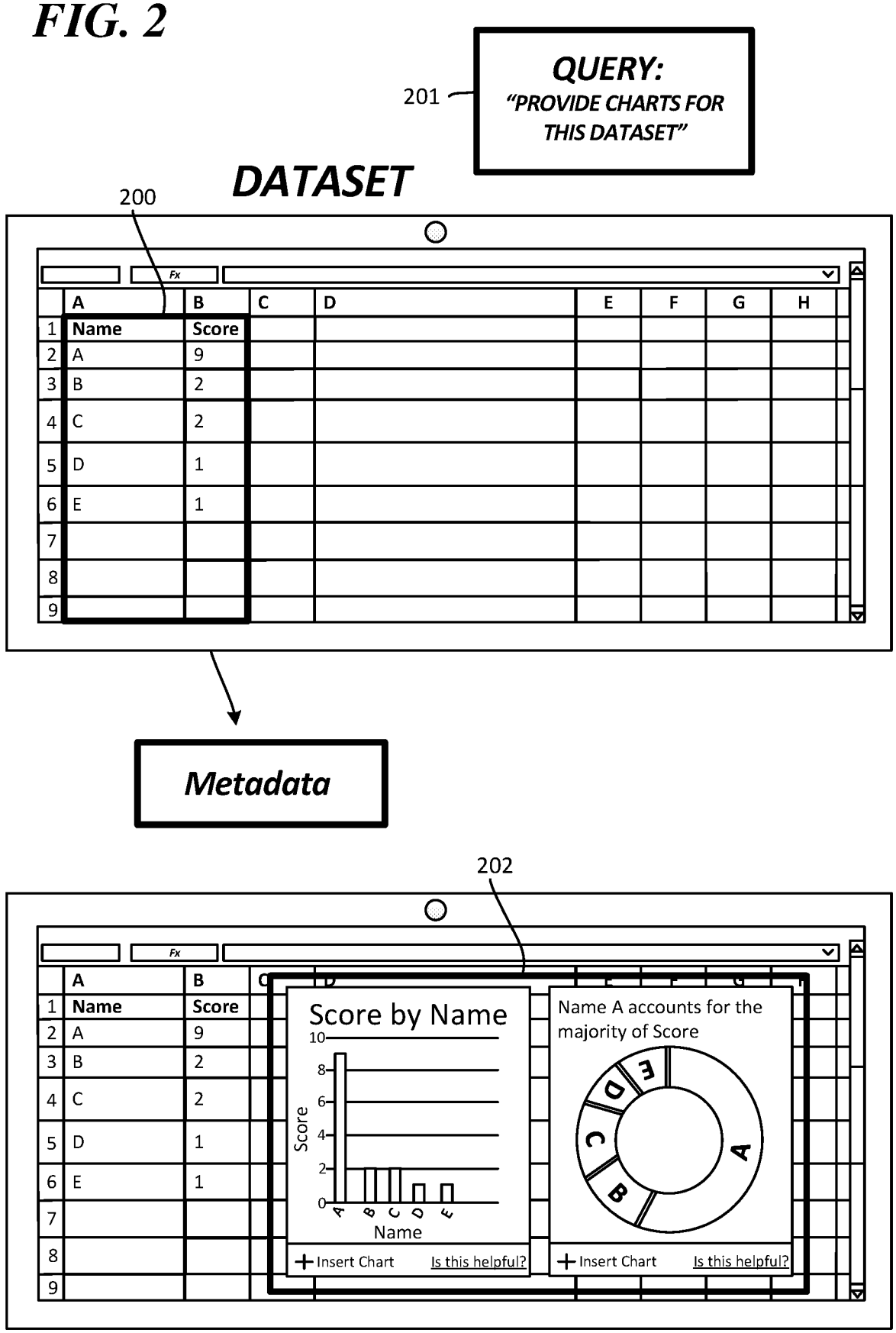
FIG. 2 illustrates operations of data insight environments in an example.

To illustrate example data set handling and metadata determination, FIG. 2 is presented. FIG. 2 illustrates further operations of the elements of FIG. 1, although the operations of FIG. 2 can be implemented by elements other than those of FIG. 1. In operation, dataset 200 can be provided along with one or more queries 201 directed to the dataset to an insight platform. For example, dataset 200 and query 201 might be provided via API 122 for processing by insight platform 120 of FIG. 1. Insight platform 120 can process the dataset and query to provide an insight result, which can be interpreted by application 111 for display as insight objects 202.

In FIG. 2, example dataset 200 is shown comprising a two-dimensional array of data in a spreadsheet application user interface. In examples, dataset 200 can comprise a table, pivot table, spreadsheet, or other dataset, or can be a subset thereof. As seen in FIG. 2, dataset 200 comprises data along with metadata. The data comprises user data values or user data entered for analysis. The metadata includes descriptions of the data, which in this case is column headers which indicate properties of the data contained in underlying columns. The metadata in dataset 200 indicates a first column "name" and a second column "score." When submitted through API 122, insight service 121 can employ metadata handler 123 to isolate the metadata from the data, along with determining other metadata as appropriate. The data and the metadata can be stored in association with an identifier into cache 132. Metadata handler 123 can provide table detection services for provided datasets. These table detection services can detect not only data arranged into two-dimensional arrays, such as tables, but also extract metadata that describes the data in the arrays.

Insight service 121 can initiate insight processing for the dataset using the metadata and one or more recommendation modules (e.g., recommendation modules 131-133). These recommendation modules can process the datasets, the queries, and the metadata to determine one or more insight results using machine learning techniques, heuristic processing, natural language processing, artificial intelligence services, or other processing elements. The insight results, as discussed herein, are presented in a portable description format, such as using a markup language (e.g. HTML, XML). A user application comprising insight handling functions can interpret the insight results in the portable format and generate one or more insight objects for rendering into a user interface and presentation to a user.

An exemplary portable insight client/application interaction, utilizing insight service 121 and API 122, is described below:
  Insight module 114 sends data to insight service 121. Insight service 121 replies with a location for RESTful resource tracking of the data.
  Insight module 114 tells insight service 121 to generate insight recommendation results and that the application is capable of rendering charts and PivotCharts. A long running task will be created on insight service 121 and insight service 121 replies with a RESTful resource that insight module 114 can use to track this operation.
  Insight module 114 queries state of operation and is told that the operation is running. Insight module 114 is also told to try polling again after a specified time lapse.
  Insight module 114 queries state of operation later and is told that the operation has succeeded. Insight module 114 is also given the location of the created resource.
  Insight module 114 asks for the insight recommendation results. In this example, there are two PivotChart recommendations, notably insight results that correspond to insight objects 202.
  Insight module 114 tells insight service 121 that insight module 114 is done with the resource tracking the data. In some examples, insight service 121 may store this data for a short amount of time (on the order of hours). In other examples, the notification that insight module 114 is done with the resource tracking of the data provides insight service 121 a request to clean up the resource immediately, thereby increasing storage capacity of one or more devices where the resource tracking data is stored.

As a further example involving the elements of FIG. 1, application 111 can comprise a spreadsheet application, word processing application, presentation application, or other user application. Application 111 may comprise various user interface elements presented by user interface 112, such as windowed dialog boxes, a user canvas from which data can be entered and manipulated, various menus, icons, control elements, and/or status informational elements. Furthermore, insight module 114 provides for enhanced user interface elements from which a user can initiate insight processing by insight platform 120, such as responsive to a user selecting an insight trigger icon or entering an insight analysis command. In some examples, users may provide background services with authorization to monitor target data sets, which can be utilized to pre-compute insight results for presentation to a user.

Typically, a user may have a set of data entered into a worksheet or other workspace presented by application 111. This data can comprise one or more structured tables of data, and/or unstructured data, and can be entered by a user or imported from other data sources into the workspace. A user might want to perform data analysis on this target data, and can select among various data analysis options presented by user interface 112. However, typical options presented for data analysis by user interface 112 and the associated application 111 might only include static graphs or might only include content that the user has manually entered. This manual content can include graph titles, graph axes, graph scaling, colors, and/or other graphical and textual content or formatting.

Example insight generation operations proceed according to a modular analysis provided by recommendation modules 130. Insight service 121 can instantiate, apply, or otherwise employ one of recommendation modules 130 to perform the insight analysis. As discussed herein, this can include analysis processes that are derived by processing metadata, query structure and content, along with other data which might comprise past usage activities, activity signals, and/or usage modalities that are found in the data. The target dataset can be processed according to various formulae, equations, functions, and the like to determine patterns, outliers, majorities/minorities, segmentations, and/or other properties of the target dataset that can be used to visualizes the data and/or present conclusions related to the target dataset. Many different analysis processes can be performed in parallel.

Insight results are determined by recommendation modules 130 and provided to insight service 121 for various formatting and standardization into the portable format output by API 122. API 122 can provide these portable insights for delivery to insight module 114 of application 111. Insight module 114 can interpret the insight results in the portable format to customize, render, or otherwise present the insight results to a user in the application. For example, when the insight results procedurally describe charts, graphs, or other graphical representations of insight results, the application can present these graphical representations.

In FIG. 2, insight results can be rendered into insight objects 202, such as the two charts shown. Metadata extracted or determined for the dataset can be included in the insight results/objects to label axes, label data portions, or otherwise provide context and descriptions for the insight results/objects. The selection or choice of an object type, such as graph or chart type, can be determined based on the dataset content, the metadata, or according to the query presented, among other considerations. For example, the query might indicate that a graph or chart, or particular graph/chart types are to be provided.

These can be presented in a graphical list format, paged format, or other display formats that can include further insights objects available via scrollable user interface operations or paged user interface operations. A user can select a desired insight object, such as a graph object, for insertion into a spreadsheet or other document. Once inserted, further options can be presented to the user, such as dialog elements from which further insights can be selected. Each insight object can have automatically determined object types, graph types, data ranges, summary verbiage, supporting verbiage, titles, axes, scaling factors, or color selections, or other features. These features can be determined by the recommendation modules using the insight results discussed herein, such as based on data analysis derived from data, metadata, or queries.

Further options can be presented to the user that allow for secondary manipulation of the insight objects or insight results. Secondary manipulation can include manipulation of the dataset or metadata to perform further insight analysis. Secondary manipulation can include various queries or questions that a user can ask about the insight object presently presented to the user, such as questions including "what happened," "why did this happen," "what is the forecast," "what if . . . " "what's next," "what is the plan," "tell this story," and the like. For example, a question "what does this insight mean?" can initiate various follow-up analysis on the datasets or details used to generate the insight, such as descriptions of the formulae, rationales, and data sources used to generate the insight. The formulae can include mathematical or analytic functions used in processing the target datasets to generate final insight objects or intermediate steps thereof. The rationales can include a brief description on why the insight was relevant or chosen for the user, as well as why various formulae, graph types, data ranges, or other properties of the insight object were established. For example, data analysis preferences derived from metadata, initial queries, or past data analysis might indicate that bar chart types are preferred for the datasets.

Forecasting questions can be queried by the user, such as in the form of "what if" questions related to changing data points, portions of datasets, graph properties, time properties, or other changes. Also, iterative and feedback-generated forecasting can be established where users can select targets for data conclusions or datasets to meet and examining what data changes would be required to hit the selected targets, such as sales targets or manufacturing targets. These "what if" scenarios can be automatically generated based on the insight datasets, metadata, or queries. Moreover, the insight object can act as a 'model' with which a user can alter parameters, inputs, and properties to see how outputs are affected and predictions are changed.

Insight results/objects can comprise dynamic insight summaries, verbiage, or data conclusions. These insight summaries can be established as insight objects that explain a key takeaway or key result of another insight object. For example, an insight summary can indicate "sales of model 2.0 were up 26% in Q3 surpassing model 1.0." This summary may be dynamic and tied to the dataset/metadata associated with the insight object, so that when data values or data points change for an insight object, the summary can responsively change accordingly. Data summaries can be provided with the insight results and include titles, graph axis labels, or other textual descriptions of insight objects. The summaries can also include predictive or prospective statements, such as data forecasts over predetermined timeframes, or other statements that are dynamic and change with the insight object.

Figure 3:
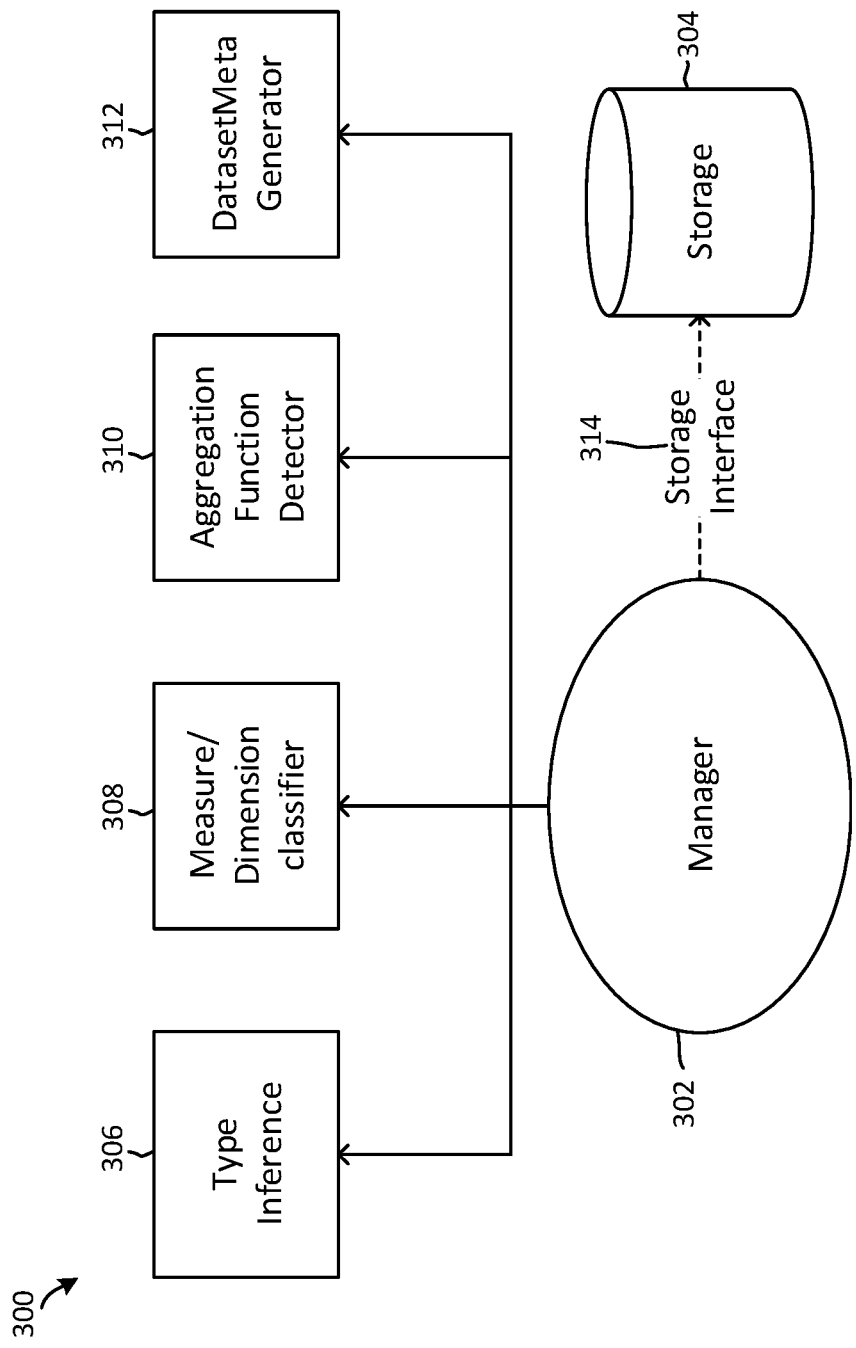
FIG. 3 illustrates operations of data insight environments in an example.

For further examples on metadata handling, such as determination and extraction of metadata for various datasets, FIG. 3 is presented. FIG. 3 includes flow diagram 300 which illustrates an example operation of the elements of FIG. 1. In FIG. 3, a metadata manager 302 is presented as an example of metadata handler 123. The metadata manager 302 can interface with one or more storage elements (e.g., storage 304), over storage interfaces (e.g., storage interface 314). The storage elements can be examples of cache 132 in FIG. 1, although further configurations can be employed. The storage elements can store metadata and user datasets for use during processing by various insight determination elements or recommendation modules, or for usage in later insight requests from users.

Turning now to the operation of elements of FIG. 3, datasets, query information, and user-provided metadata can be delivered to an insight platform that includes a metadata manager 302. The metadata manager 302 can then process the provided datasets/queries/metadata to determine further metadata associated with the datasets. This metadata can be employed in insight processing by one or more recommendation modules. As shown in FIG. 3, metadata manager 302 can provide various services such as data type inference, data measure/dimension classification, and data aggregate function detection. Outputs from these services can be provided to a dataset metadata generation service for processing and output of metadata for the associated datasets.

A further discussion of the metadata operation continues below. In an example, operation of metadata components illustrated in FIG. 3 may comprise the following:

Metadata is computed once and reused across different recommenders of the insight service.

Internal subcomponents of the metadata system are typically not recomputed metadata properties that are computed by other subcomponents.

Metadata is cached and typically not recomputed across multiple requests for the metadata.

Whenever a property of the metadata changes (for example, through a user action), only the metadata properties that depend on the changed property are typically recomputed.

The metadata service can be divided into two major parts. A set of components that compute individual pieces of metadata, and a manager 302 class which holds references to each of the components.

As mentioned above, various components form the metadata services. The type inference component 306 determines the type of each column of a dataset. A measure v/s dimension classification component 308 classifies each column as a dimension or a measure. An aggregation function detector component 310 suggests aggregation functions for each column. A DatasetMeta generator component 312 generates the DatasetMeta object. A sequential detector component determines whether the data in a column is sequential in nature. It should be noted that the term 'column' can instead be referred to as a 'field' in further examples.

The metadata manager 302 can comprise a software component 'class' that maintains a list of metadata components. Additionally, the manager 302 class may also maintain an interface to a cache to ensure that re-computation of the metadata for the same input is not necessary. The cache may store a task for every metadata operation being run. This is so that multiple components requesting the metadata can wait on the task if it is still running or directly get the results without waiting if the task has completed. In some examples, the recommenders/providers may only be able to access the metadata through the manager 302 class.

An example metadata manager 302 class can be defined as follows:

```
static class MetadataManager
{
    static MetadataManager( )
    {
    }
    public static IMetadata GetMetadata(ITableView data)
    {
    }
}
public interface IMetadata
{
    Task<IColumnTypes> ColumnTypes { get; }
    Task<IColumnMeasureDimensionHints> MeasureDimensionHints
    { get; }
    Task<IColumnAggregationFunctionTypes>
ColumnAggregationFunctionTypes { get; }
    Task<IColumnSequentialities> ColumnSequentialities { get; }
    Task<DatasetMeta> DatasetMeta { get; }
}
```

Input to each of the metadata processing components can be the raw datasets and any additional metadata that is obtained from the client (for example, cell formats). The metadata components may be aware of the metadata manager 302 so that they can obtain any additional metadata. For example, if the measure/dimension classifier requires column types, it can request types from the manager 302 class which may subsequently call the type detection component, if those types do not already exist in its cache. Each of the components may implement task-based parallelism. This allows multiple components to wait on the results of a component.

The type inference component 306 may comprise a platform into which multiple type inference providers can be plugged. The provider may accept a standard input and provide types in a standard output format. The input may be a structured form of the data and the output may be a collection of types. Each of the types may have one or more confidence metrics associated with them. The collections of the types from all providers may be provided as input to an aggregation algorithm which may be used to determine a final type for each column.

Turning to a further discussion of the elements of FIG. 3, the measure/dimension classifier component 308 takes as input the output of the type inference process. The classifier may have a design similar to the type inference system where there may be multiple providers which output their results into an aggregation algorithm to determine the final type decision for one or more columns. The Aggregation Function Detector component 310 generates a list of aggregation functions for measures. The DatasetMeta Generator component 312 creates the DatasetMeta object. The Sequential Data Detector determines whether the given data is sequential in nature.

Input and Output Interfaces can also be defined for the metadata components. The input to the metadata manager 302 and its components may comprise a form of an interface IRangeData which provides the Cell Values, Cell formats and the Column Headers. The metadata manager 302 and all its components may be agnostic of the column orientation. The metadata manager 302 may detect table orientation in the table recognition step which is independent of metadata detection.

An example table recognition process can be as follows:

```
interface ITableView
{
   IEnumerable<string> ColumnHeaders { get; }
   IEnumerable<IEnumerable<string>> ColumnData { get; }
   IEnumerable<string> ColumnFormats { get; }
   IEnumerable<IEnumerable<string>> CellFormats { get; }
}
interface IColumnTypes
{
   IEnumerable<FieldDataType> ColumnTypes { get; }
}
   interface IColumnMeasureDimesionHints
{
   IEnumerable<MeasureDimensionHint> MeasureDimensionHints { get; }
}
interface IColumnAggregationFunctionTypes
{
   IEnumerable<IEnumerable<AggrFunc>> AggregationFunctions { get; }
}
```

The internal structure of the type inference component 306 may also be implemented as a platform. Two or more type inference algorithms can be used. A first type inference algorithm may be based on number formatting that is obtained from a client application. A second type inference algorithm may be based on a preprocessor. Each algorithm may take as input a string array representing a single column and return an array of types for the column. Each type may have a confidence level associated with it. In some examples, the confidence levels may be fed into an aggregation algorithm which may then generate a single type for each column. These types may be added to the DatasetMeta that is passed in. Further examples can add the entire list of types inferred along with the confidence metrics in the DatasetMeta. The internal structure of the dimension/measure classifier component 308 may have a similar pattern as the type inference component 306 with multiple classifiers whose results may be fed into an aggregation algorithm to generate a set of dimensions and a set of measures.

Further examples of metadata handling components that may be incorporated for generating insights and selecting appropriate insight types for datasets can include implementing a cache so that metadata does not need to be recomputed across multiple requests, and implementing a dependency graph so that on changes to metadata properties, only properties that depend on the changed properties need to be recomputed.

Figure 4:
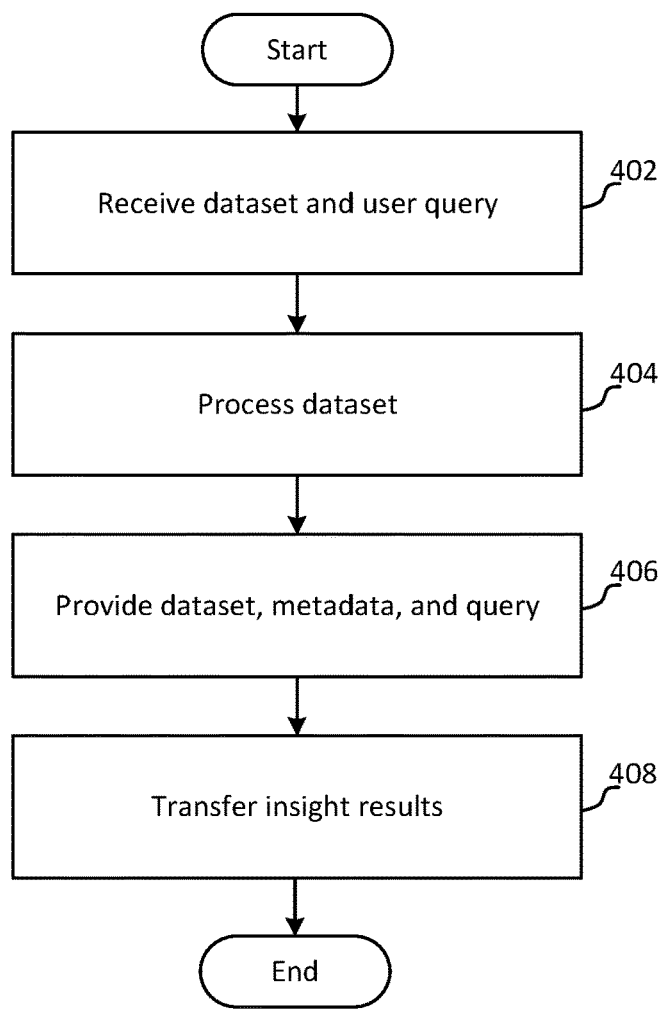
FIG. 4 is a first exemplary method for providing insight results in a productivity application.

FIG. 4 is a first exemplary method 400 for providing insight results in a productivity application. The method 400 begins at a start operation and flow continues to operation 402 where a dataset and a user query relating to the dataset are received. In some examples the dataset may comprise a plurality of values comprised in one or more columns or rows of a productivity application. In additional examples the dataset may comprise a table or a pivot table of a productivity application. In still other examples, the dataset may comprise a plurality of values obtained from a data source accessed by one or more components of a user platform, such as user platform 110 illustrated in FIG. 1, and/or one or more components of an insight platform, such as insight platform 120 illustrated in FIG. 1.

In some examples, the user query received at operation 402 may comprise a natural language question posed by a user of a productivity application. In examples, the user may provide the query to the productivity application via a verbal or typed input type. In other examples, the user query may be initiated by a user providing an input to a productivity application (e.g., hovering a mouse, providing a mouse click, touching a touch-sensitive display) in the vicinity of a target dataset in the productivity application. Upon receiving the initiation of the user query via the user input to the productivity application, one or more selectable user interface elements may be provided for sending a corresponding user query corresponding to the selected target dataset to one or more components of insight platform 120. In some examples, the selectable user interface elements may be provided for selection based on past user data related to the productivity application and/or past user data related to dataset queries provided to the productivity application.

From operation 402 flow continues to operation 404 where the dataset is processed to determine metadata that describes one or more properties of the dataset. The metadata may be provided by the user and/or a productivity application associated with the dataset. In examples, the metadata may comprise properties or descriptions associated with the received dataset, such as column and/or row headers, footers, data contexts, data orientations, and application properties of the productivity application. In some examples, the metadata may be determined by a metadata handler to establish metadata for the dataset. For example, a metadata handler may analyze one or more features associated with dataset, such as data features included in the dataset, value types included in the dataset, symbols in the dataset, values included in the dataset, and/or patterns included in the dataset, and assign metadata to the dataset based on the analysis. In some examples, the metadata associated with the dataset may be cached for later processing of the received dataset or datasets that are determined to be similar to the received dataset.

From operation 404 flow continues to operation 406 where the dataset, metadata, and query are provided to one or more modular recommendation elements for processing into an insight result for the dataset that indicates a result from data analysis directed to the query. The one or more modular recommendation elements may utilize one or more of: past user activity, application usage modalities, organizational traditions with regard to data analysis, and/or individualized data processing techniques, in processing the dataset, metadata, and query. For example, if past user activity associated with the productivity application indicate that the user prefers that one or more specific insight types (e.g., a graph of a dataset, a textual explanation of information associated with a dataset, projections associated with a dataset) be provided based on a query type that is similar to the received query, and/or a dataset type that is similar to the received dataset, the one or more modular recommendation elements may process the dataset, metadata, and query into an insight result corresponding to the user's preferences.

From operation 406 flow continues to operation 408 where insight results are transferred for use by the productivity application in displaying one or more insight objects based on the insight result. The one or more insight objects may comprise charts, tables, pivot tables, graphs, textual information, interactive visual application elements, selectable application elements for audibly communicating information associated with the dataset, and/or pictures. The one or more insight objects may provide visual and/or audible indications of: information associated with the dataset, summaries of key takeaways associated with the dataset, comparisons of information from the dataset with one or more other datasets related to the dataset, and projections for one or more values or categories associated with dataset.

In some examples, the one or more values of a dataset corresponding to one or more of the displayed insight objects, and/or metadata associated with a dataset corresponding to one or more of the displayed insight objects, may be interacted with and a display element associated with the interaction may be reflected in one or more affected insight objects. In other examples, one or more of the displayed insight objects may be interacted with, and a corresponding one or more values of the dataset, or a related dataset, may be caused to be modified in associated with the interaction. In additional examples a user may provide, via the productivity application, follow-up queries related to the insight results (e.g., "what happened", "why did this happen", "what is the forecast", "what if . . . ", "what's next", "what is the plan", "tell this story"), and additional analysis may be performed for providing information related to a received follow-up query (e.g., providing a description of formulae utilized in generating the insight results, providing a description of rationales for the displayed insight objects, providing a description of data sources used to generated the displayed insight objects).

From operation 408 the method 400 continues to an end operation, and the method 400 ends.

Figure 5:
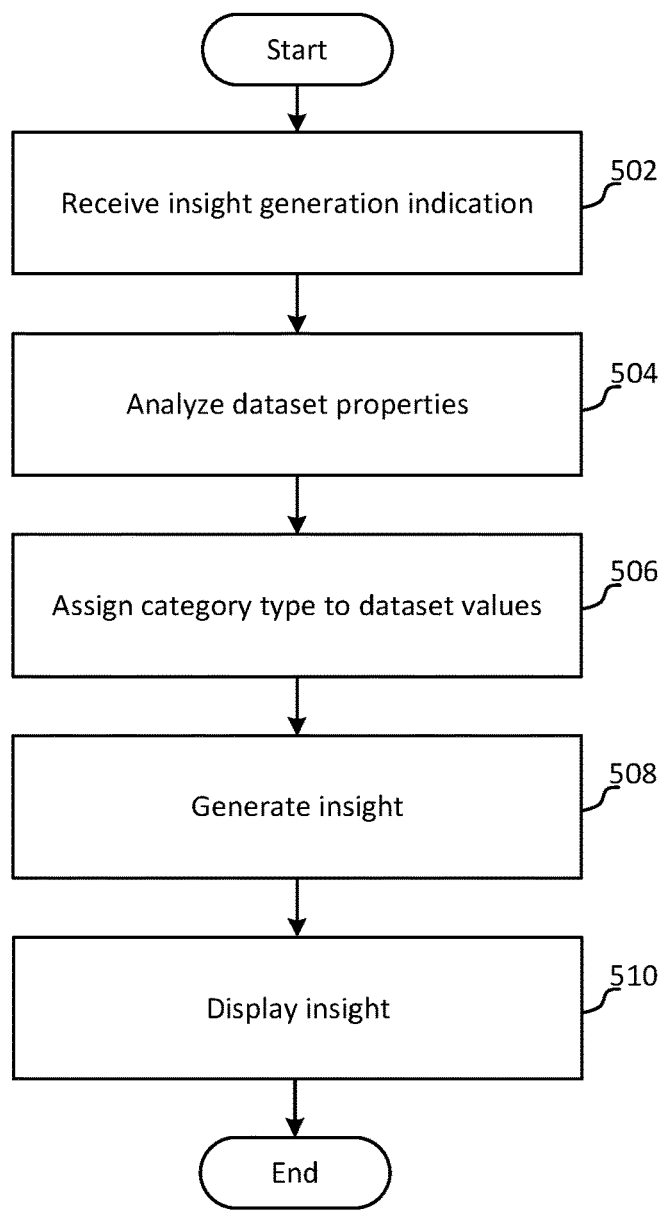
FIG. 5 is a second exemplary method for providing dataset insights for a productivity application.

FIG. 5 is a second exemplary method 500 for providing dataset insights for a productivity application. The method 500 begins at a start operation and flow continues to operation 502 where an indication to generate an insight associated with a dataset is received. The indication may comprise a typed command, a verbal command, a command issued via a mouse click, a command issued by interacting with the dataset, a user interaction associated with a user interface element of a productivity application, and/or an automatic indication received based on automated analysis of one or more datasets associated with a productivity application (e.g., an analysis of one or more datasets based on the datasets being created, the analysis of one or more datasets based on information associated with the one or more datasets being modified).

From operation 502 flow continues to operation 504 where one or more properties associated with the dataset are analyzed. The one or more properties may comprise values include in the dataset, values of one or more datasets related to the dataset, column headers associated with the dataset, column footers associated with the dataset, font properties of data in the dataset, relationships of data in the dataset to one or more other datasets, and metadata associated with the dataset. According to some examples, the analysis of the one or more properties may comprise identifying one or more patterns associated with a plurality of values in the dataset, identifying relationships of the dataset to one or more other datasets, and identifying past user interaction related to the dataset or one or more similar datasets.

From operation 504 flow continues to operation 506 where a category type is assigned to a plurality of values of the dataset based on the analysis of the one or more properties at operation 504. In examples, the category type may comprise a value type (e.g., a text value type, a number value type, a symbol value type, a denomination value type, a date value type, a specific function value type, an address value type, a person name value type, and an object type value type (e.g., company names, book names, social security numbers, performance ratings, sales figures, geographic locations, colors, shapes, category types).

From operation 506 flow continues to operation 508 an insight associated with the dataset is generated by applying at least one function to a plurality of values of the dataset. In examples, the at least one function may comprise one or more of: a sort function, an averaging function, an add function, a subtract function, a multiply function, a divide function, a graph generation function, a chart generation function, a pattern identification function, a summarization function, and a projection function. In examples, the at least one function may be applied based on past user history associated with the productivity application, a type of user query corresponding to the received indication to generate the insight, and the ability to apply the at least one function to value types included in the dataset.

From operation 508 flow continues to operation 510 where the generated insight is caused to be displayed in a user interface of the productivity application. In examples, the displayed insight may comprise charts, tables, pivot tables, graphs, textual information, interactive visual application elements, selectable application elements for audibly communicating information associated with the dataset, and/or pictures. The displayed insight may provide visual and/or audible indications of: information associated with the dataset, summaries of key takeaways associated with the dataset, comparisons of information from the dataset, summaries of key takeaways associated with the dataset, comparisons of information of information from the dataset with one or more other datasets related to the dataset, and projections for one or more values or categories associated with the dataset.

From operation 510 flow continues to an end operation, and the method 500 ends.

The systems, methods, and devices described herein provide technical advantages for interacting and viewing information associated with productivity applications. For example, users may be provided with dataset insights, which may be generated with a specific querying user taken into account, that visually and/or audibly communicate key takeaways associated with a dataset, summaries of information included in a dataset, comparisons of data in a dataset, comparisons of data in a dataset with data from other related datasets, and projections associated with a dataset.

As described herein, an insight service may process dataset insight queries in a single, portable, format via an insight API, and provide one or more generated insights of one or more insight types, to a plurality of different application types (which may each support various different insight features), in a portable format. The ability of the insight service to uniformly analyze, process, and generate insights in a portable format reduces processing costs (i.e., CPU cycles) that would otherwise be required for multiple application-specific insight services, or multiple application-specific insight service engines, to perform that analysis, processing, and generation of insights that are specific to each application type from which insight queries may be received.

The ability to generate insights for datasets based on the analysis of user provided metadata for datasets, metadata associated with datasets based on dataset creation, and/or the association of metadata with datasets based on analysis of dataset information via an insight service and the mechanisms described herein allows for the surfacing of summary and/or key information associated with datasets, which can be interacted with in various ways in order to quickly view the result of modifications to surfaced insights and/or dataset values. These enhanced features provide a better user experience, the ability to quickly and efficiently identify and view relevant information associated with large datasets, which may not otherwise be readily identifiable due to the size of a dataset, and cost savings at least in the time required to identify relevant data in productivity applications, and the processing costs required to identify relevant data in datasets and navigate large datasets comprised in productivity applications and/or datasets from which one or more values of a productivity application depend.

Figure 6:
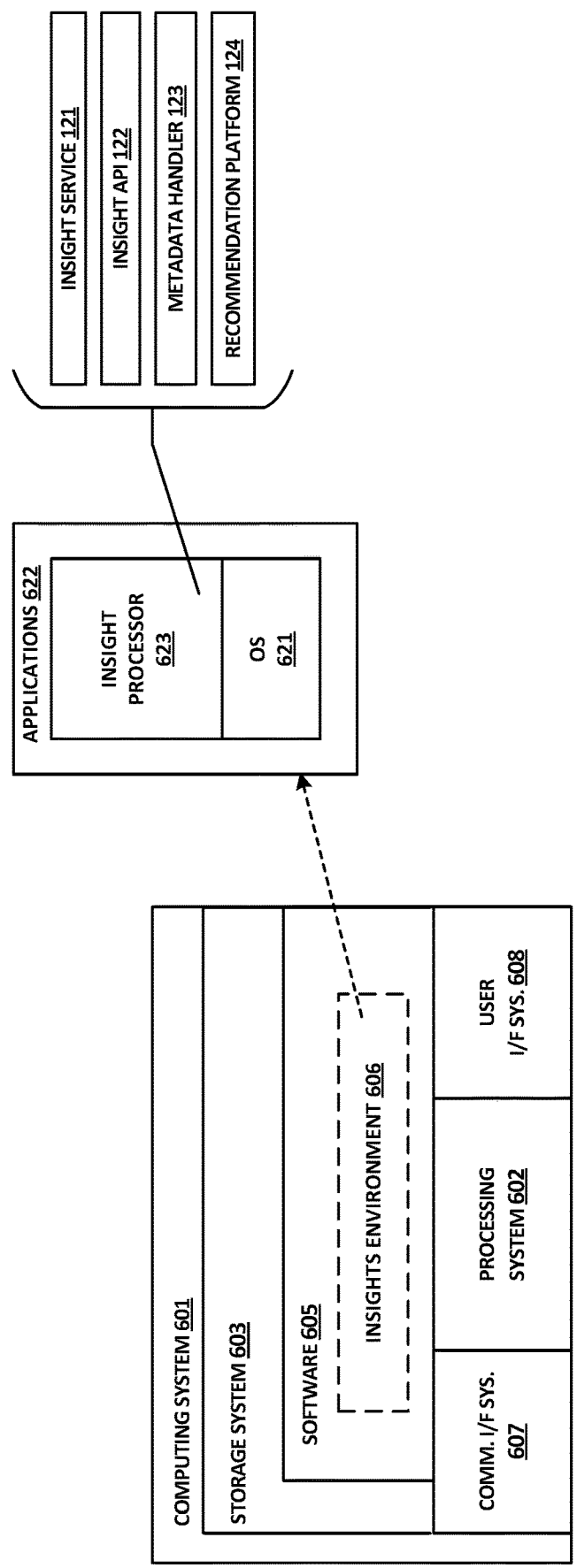
FIG. 6 illustrates a computing system suitable for implementing any of the architectures, processes, and operational scenarios disclosed herein.

Turning now to FIG. 6, computing system 601 is presented. Computing system 601 that is representative of any system or collection of systems in which the various operational architectures, scenarios, and processes disclosed herein may be implemented. For example, computing system 601 can be used to implement any of user platform 110 or insight platform 120 of FIG. 1. Examples of computing system 601 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 601 are implemented on user devices, example devices include smartphones, laptop computers, tablet computers, desktop computers, gaming systems, entertainment systems, and the like.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 608. Processing system 602 is operatively coupled with storage system 603, communication interface system 607, and user interface system 608.

Processing system 602 loads and executes software 605 from storage system 603. Software 605 includes insights environment 606, which is representative of the processes discussed with respect to the preceding Figures. When executed by processing system 602 to enhance data insight generation and handling, software 605 directs processing system 602 to operate as described herein for at least the various processes, operational scenarios, and environments discussed in the foregoing implementations. Computing system 601 may optionally include additional devices, features, or functionality not discussed for purposes of brevity.

Referring still to FIG. 6, processing system 602 may comprise a microprocessor and processing circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, resistive memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing the dataset processing environments and platforms discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software or other application software, in addition to or that include insights environment 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate data insight generation and handling. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Insights environment 606 includes one or more software elements, such as OS 621 and applications 622. These elements can describe various portions of computing system 601 with which users, dataset sources, machine learning environments, or other elements, interact. For example, OS 621 can provide a software platform on which application 622 is executed and allows for processing datasets for insights and visualizations, among other functions. In one example, insight processor 623 implements elements from insight platform 120 of FIG. 1, namely elements 122-124.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 607 can receive datasets, transfer datasets, metadata, and control information between one or more distributed data storage elements, and interface with a user to receive data selections and provide insight results, among other features.

User interface system 608 is optional and may include a keyboard, a mouse, a voice input device, a touch input device for receiving input from a user. Output devices such as a display, speakers, web interfaces, terminal interfaces, and other types of output devices may also be included in user interface system 608. User interface system 608 can provide output and receive input over a network interface, such as communication interface system 607. In network examples, user interface system 608 might packetize display or graphics data for remote display by a display system or computing system coupled over one or more network interfaces. Physical or logical elements of user interface system 608 can receive datasets or insight selection information from users or other operators, and provide processed datasets, insight results, or other information to users or other operators. User interface system 608 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the hypertext transfer protocol (HTTP), Internet protocol (IP, IPv4, IPv6, etc.), the transmission control protocol (TCP), and the user datagram protocol (UDP), as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of providing insight results in a productivity application, the method comprising:
   receiving a dataset and a user query relating to the dataset;
   processing the dataset to determine metadata that describes a property of the dataset;
   providing the dataset, the determined metadata, and the user query to a modular recommendation element;
   selecting, based on data analysis preferences derived from organizational data analysis traditions, a specific insight type from a plurality of insight types;
   generating an insight result for the dataset, wherein the insight result has the specific insight type, and wherein the insight result indicates a result from data analysis directed to the query;
   transferring the insight result for use by the productivity application in displaying an insight object based on the insight result;
   receiving an indication that a property of the insight object has been modified;
   modifying, based on the indication, a corresponding value of the dataset;
   receiving a natural language user query to surface a rationale for why the insight result was generated; and
   causing a description of why the specific insight type was selected from the plurality of insight types to be surfaced.

2. The method of claim 1, wherein a specific function is selected, from a plurality of functions, for processing a plurality of values of the dataset based on the specific function having a same property type assigned to it as a property type described in metadata for the plurality of values of the dataset.

3. The method of claim 1, wherein the property comprises one of: column headers associated with the dataset; one or more column footers associated with the dataset; and metadata associated with the dataset comprising a description of value property types associated with one or more values in the dataset.

4. A system for providing dataset insights for a productivity application, the system comprising:
a memory for storing executable program code; and
a processor, functionally coupled to the memory, the processor being responsive to computer-executable instructions contained in the program code and operative to:
receive an indication to generate an insight associated with a dataset;
analyze a property associated with the dataset;
assign, based on analyzing the property, a category type to a value of the dataset;
selecting, based on data analysis preferences derived from organizational data analysis traditions, a specific insight type from a plurality of insight types;
generate an insight associated with the dataset, wherein the insight has the specific insight type, and wherein the generating comprises applying a function associated with the category type to the value of the dataset;
cause the generated insight to be displayed in a user interface of the productivity application;
receive a selection of an element on the displayed insight, wherein the element corresponds to the value of the dataset;
modify a property of the displayed insight corresponding to the selection;
modify, based on the modification of the property, the value of the dataset;
receive a natural language user query to surface a rationale for why the insight was generated; and
cause a description of why the specific insight type was selected from the plurality of insight types to be surfaced.

5. The system of claim 4, wherein the applied function is selected from a plurality of functions, each of the plurality of functions being associated with one or more value category types, and wherein a function of the plurality of functions can be applied to a value that has a same category type assigned to it as a corresponding function.

6. The system of claim 4, wherein the property comprises one of: a column header associated with the dataset; a column footer associated with the dataset; and metadata associated with the dataset comprising a description of the dataset.

7. The system of claim 4, wherein analyzing the property associated with the dataset comprises identifying a pattern associated with a plurality of value in the dataset.

8. The system of claim 4, wherein the specific insight type for the displayed insight is selected from one of: a graph associated with a plurality of values of the dataset; a chart associated with a plurality of values of the dataset; and a pivot table associated with a plurality of values of the dataset.

9. The system of claim 4, wherein the processor is further responsive to the computer-executable instructions contained in the program code and operative to:
identify a second dataset associated with the assigned category type; and
utilize one or more values included in the second dataset in at least one of the applied functions.

10. The system of claim 9, wherein the processor is further responsive to the computer-executable instructions contained in the program code and operative to:
receive an indication to provide information associated with one or more criteria utilized in generating the insight; and
cause, based on the received indication, a description of the second dataset to be displayed in the user interface of the productivity application, wherein the description of the second dataset comprises one of: a location in the productivity application where the second dataset is located; a file where the second dataset is located; a remote storage location where the second dataset is located; and a web address where the second dataset is located.

11. The system of claim 10, wherein the processor is further responsive to the computer-executable instructions contained in the program code and operative to:
cause metadata associated with the dataset, and historical user data for the productivity application to be cached;
receive an indication to generate a second insight associated with the dataset; and
cause the second insight to be displayed in a user interface of the productivity application, in an insight type specific to the cached metadata and the cached historical user data.

12. The system of claim 4, wherein the processor is further responsive to the computer-executable instructions contained in the program code and operative to:
receive a modification to a value in the dataset utilized in generating the insight;
re-apply at least one of the applied functions to the value based on the received modification; and
modify one or more display properties of the displayed insight in the user interface of the productivity application based on the result of the re-applied at least one function.

13. A computer-readable storage device comprising executable instructions that, when executed by a processor, assists with providing dataset insights for a productivity application, the computer-readable storage device including instructions executable by the processor for:
receiving a user query to generate an insight associated with a dataset;
causing, based on an assigned value category type associated with a value of the dataset and data analysis preferences derived from organizational data analysis traditions, a plurality of insight display type categories selectable for generating insight results for the dataset to be displayed in a user interface of the productivity application;
receiving a selection of one of the insight display type categories;
causing an insight result for the dataset corresponding to the selected insight display type category to be displayed in the user interface of the productivity application;
receiving a selection of an element on the displayed insight result, wherein the element corresponds to the value of the dataset;
modifying a property of the displayed insight result corresponding to the selection;
modifying, based on the modification of the property, the value of the dataset;
receiving a natural language user query to surface a rationale for why the insight result was displayed; and causing a description of why the insight result was displayed to be surfaced, wherein the description provides an indication of the data analysis preferences derived from the organizational data analysis traditions.

14. The computer-readable storage device of claim 13, wherein the value category type associated with the value of the dataset is assigned based on at least one of: data included in one or more column headers associated with the dataset; data included in one or more column footers associated with the dataset; and user-provided data that describes the one or more values of the dataset.

15. The computer-readable storage device of claim 13, wherein the instructions are further executable by the processor for:
   receiving an API call-in from the productivity application for the insight; and
   sending, based on the API call-in, the user query, and the assigned value category type associated with the value of the dataset, the insight result to the productivity application in a standardized output for interpretation by a plurality of application types.

* * * * *